May 17, 1955 — L. M. JORDAN — 2,708,362
COMPRESSION TESTING MACHINE
Filed July 7, 1953 — 2 Sheets-Sheet 2

INVENTOR.
Leo M. Jordan
BY Brown, Jackson, Boettcher & Dienner
ATTORNEYS.

2,708,362
Patented May 17, 1955

2,708,362
COMPRESSION TESTING MACHINE

Leo M. Jordan, South Bend, Ind., assignor, by mesne assignments, to Studebaker-Packard Corporation, a corporation of Michigan Application July 7, 1953, Serial No. 366,564

1 Claim. (Cl. 73—89)

The present invention has to do generally with testing apparatus and more particularly with a new and improved device for testing the compressibility of resilient materials, such as rubber and the like.

Presently available apparatus for testing linear diminution of resilient materials such as rubber under compressive loads have proven unsatisfactory from a number of standpoints, chief of which is the inability to accurately measure the linear deflection or reduction in size of the rubber-like materials being tested. As a consequence, I have set about to devise a new and improved device of simplified construction and operation embodying simple expedients for determining with accuracy the linear deflection or compressibility of such resilient materials as rubber. Briefly, the testing device or apparatus of my invention comprises a vertically moveable yoke or platform member arranged to be hydraulically actuated along a set path under given test pressures and which is moveable relative to a stationary platform member. Materials to be tested are placed between the two platforms and test pressure applied to the moveable one thereof. Such moveable platform is then moved under the test pressures toward the stationary platform and a linear measurement of the compression of materials placed between such two platforms measured by means of an accurate and delicate dial type micrometer gauge.

The main object of my present invention is to provide a new and improved testing apparatus especially arranged and devised to test linear deflection or compressibility of materials, such as rubber.

Another object of my invention is to provide a testing machine for measuring the linear deflection of compressable materials of a resilient nature in which means are employed to gauge the testing pressure and to measure the linear deflection of the material tested under testing loads.

The above further objects, features and advantages of my invention will be recognized by those familiar with the art from the following detailed description and specification of a preferred embodiment of its concepts as illustrated in the accompanying drawings.

Figure 1:
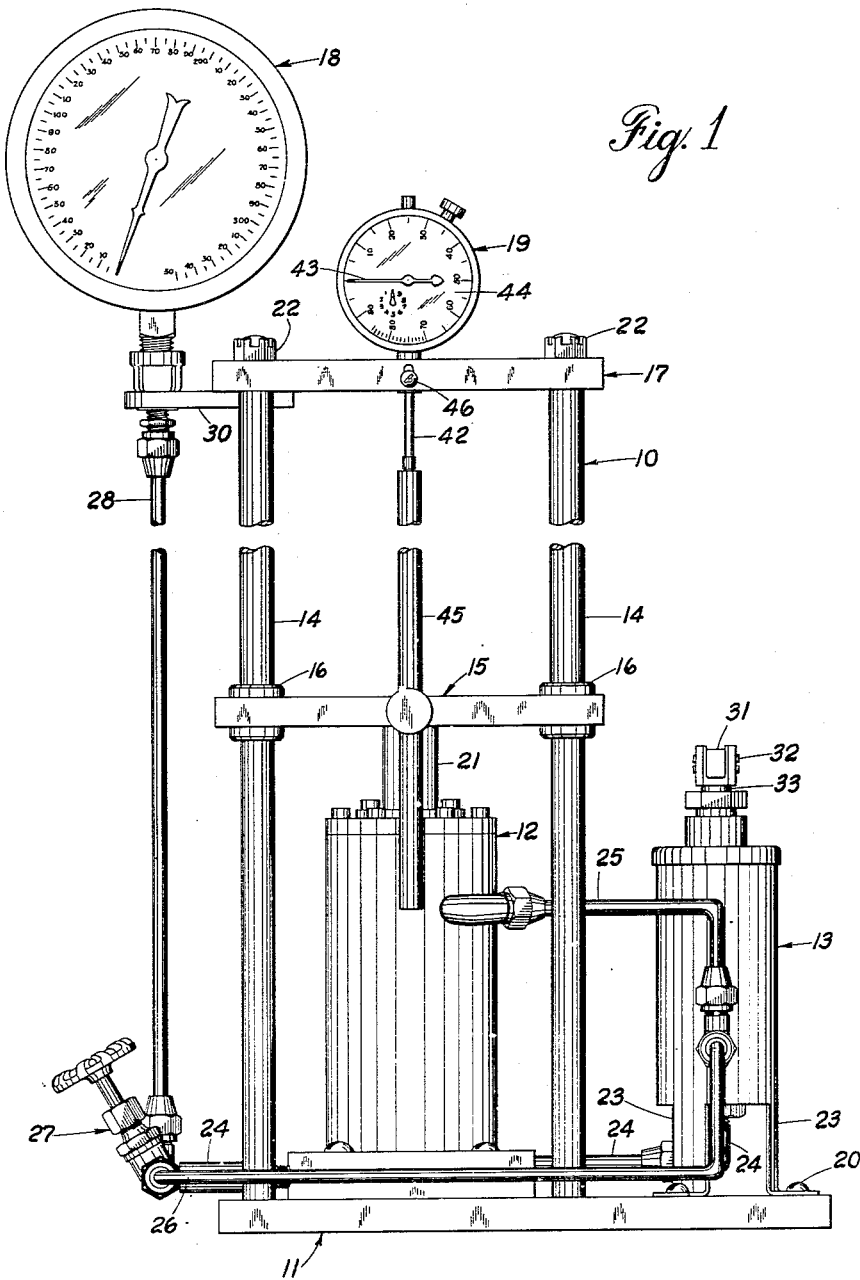
Figure 1 is a front elevational view of a testing apparatus embodying the features and concepts of my invention.

Turning now to the features and construction of my improved testing machine 10 illustrated in the drawings, it will be recognized that the same comprises and includes a base member 11 on which is mounted a master cylinder and piston assembly 12 along with a compressor hydraulic pump means 13. Four rod-like stanchion members 14, 14 are extended in upright relation from the supporting base 11 and a moveable platform member 15 is supported by sliding collar means 16 for linear movement along such upright rod members 14. It will be appreciated that the rods 14 serve to guide the platform 15 during movement thereof. The upper ends of the several rod members 14 are tied together by a stationary planar table or platform 17 comprising a metallic plate of steel or the like, having suitable strength and rigidity. A pressure gauge 18 for measuring test pressures and a micrometer gauge 19 which is capable of indicating linear measurements are provided as well.

The above named elements constitute the major portions of my device and such will now be described individually at greater length.

The base member 11 may comprise any suitable section of sheet material, preferably boiler plate or the like preferably formed substantially rectangular in plan.

The master cylinder and piston arrangement 12 may comprise any suitable and known style of hydraulic cylinder and piston means of which there are numerous commercially available and the same is preferably disposed upright on top of the base plate 12 so that a piston rod 21 thereof extends upwardly in vertical disposition relative to the base plate and is rigidly tied centrally to the moveable table member 15.

The rod members 14 should be uniform in their diametrical dimensions and of a standard and uniform height capable of meeting the dimensional requirements of the materials being tested.

The table member 15, being moveable, must necessarily be guided in its vertical movements and to that end four bores (not shown) are disposed on the four corner portions of its rectangular shape for receiving the guide collars 16 which are suitably sized, shaped and constructed to receive the rod members 14 therethrough. Thus I provide a sliding support means for the moveable table 15.

The stationary table 17 which is disposed at the upper ends of the several rod members 14 is formed of a like shape, size and dimension with the moveable table 15 and likewise is provided with apertures adjacent its four corners for receiving the upper ends of the guide rods 14 therethrough. Nut members 22, 22 are utilized to stationarily affix the table member 17 to the upper ends of the guide rods which are threaded for this purpose.

In order to supply suitable pressures to the piston within the cylinder assembly 12, the hydraulic pump means 13, which may comprise any suitable type of piston and cylinder pump as herein illustrated or a more elaborate style if desired, is connected to the base plate 11 by fastener means 20 extending through and tieing foot portions 23 of the pump assembly to the base plate. A discharge pipe line 24 leads from the bottom side of the pump to the lower end of the master cylinder assembly 12, the two carrying a sufficient reservoir of oil or like hydraulic fluid to operate the system. The upper end of the master cylinder communicates via pipe line 25 with the reservoir or intake side of the pump assembly and a pressure line 26 having a manually operated valve means 27 therein is connected with supply line 24 and piping 28 which leads to the lower side of pressure gauge 18. Gauge 18 is suitably supported on the stationary platform 17 by bracket means 30, substantially in the manner illustrated.

Operation of the pump means is carried forth by suitable handle means 31 pivotally interconnected intermediate its ends by pivot means 32 to the upper end of the pump's piston rod 33. The inner end of handle 31 is pivotally tied through a suitable linkage 34 to a support 35 on the pump housing or cylinder.

Figure 2:
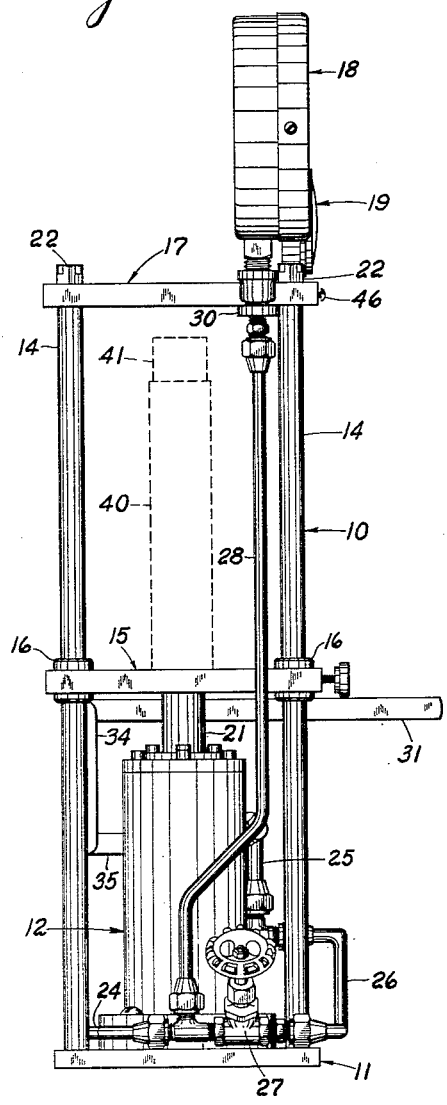
Figure 2 is an end elevational view, taken from the left hand end of the apparatus as viewed in Figure 1, showing the arrangement of placing material to be tested in the machine illustrated.
Figure 3:
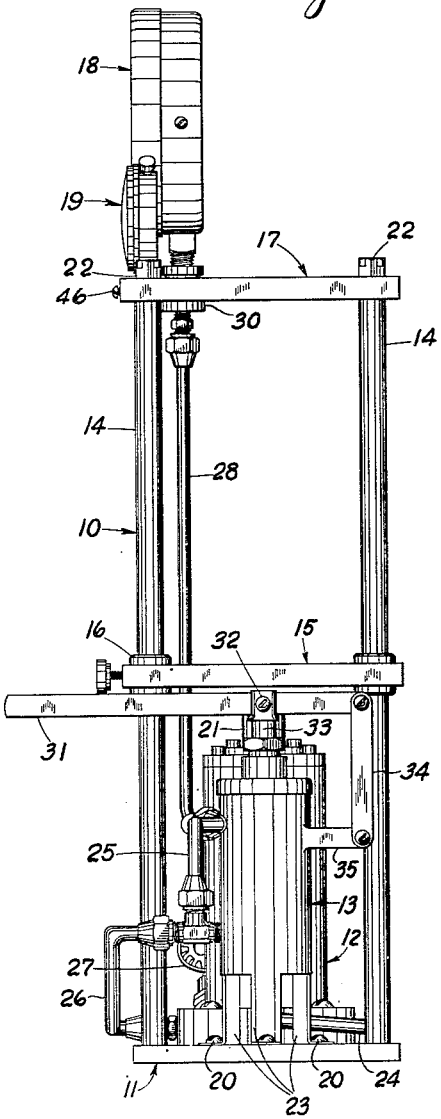
Figure 3 is an end elevational view, similar to Figure 2 of the drawings, but looking at the right hand end of the machine illustrated in Figure 1.

To operate the arrangement hereinabove described, a spacer block 40 (illustrated in phantom lines in Figure 2 of the drawings) is normally placed on top of the moveable platform member 15 and a resilient member, for example a cylindrical rubber button means 41, to be tested, is placed intermediate the upper end of the spacer block and the lower face of the immobile platform or table 17. Pressure is then applied to the piston within the master cylinder assembly 12 by operating or oscillating the pump handle 31 which results in a vertically upward displacement of the moveable platform member 15. This compresses rubber button means 41 between block 40 and platform 17.

Measurement of the test pressure applied, is carried out by closing the valve means 27 causing the direct transmission of the discharge pressure from the pump to communicate with the pressure gauge 18 via the tubing 28. Since the micrometer gauge 19, herein illustrated as a conventional dial type, is fixed to the immobile platform 17, means must be provided to actuate its quill portion 42 so that the dial pointer 43 thereof may be moved relative to its graduated dial face 44 in measuring the linear deflection of the compressed rubber button 41.

To this end, a rod member 45 is adjustably supported by means of a thumb set screw 46 on the moveable platform 15. The spaced relationship between the upper end of rod member 45 and the lower end of quill portion 42 of the micrometer gauge is then set so that the same lightly contact when the rubber button is brought into contact with the lower face of the platform 17. It will therefore be recognized that having supplied the tube pipe system interconnecting the pump means 13 and master cylinder and piston assembly 17 with pressure as indicated on the pressure recording gauge 18, deflection or diminution in the vertical height or dimension of the rubber button 41 will be registered by movement of the pointer 43 across the graduated dial face 44. Such deflection is usually read off in terms of thousandths of an inch or the like. Having once measured the deflection of the rubber button at a given test pressure, release of the system and the downward movement of the moveable platform 17 is brought about by opening the manual relief valve 27 which permits the hydraulic fluid to vent back into the reservoir portion of the pump means 13.

It will therefore be recognized from the description which appears hereinabove that I have disclosed and illustrated a new and improved testing machine having special adaptation for measuring linear deflection or compressibility of rubber-like materials. Further, it will be appreciated and understood that numerous changes, modifications and substitutions of equivalents may be made in the device illustrated without departing from the spirit and scope of my invention. As a consequence I do not wish to be limited to the particular embodiment of my invention herein illustrated and described except as may appear in the following appended claim.

I claim:

A testing apparatus of the class described, comprising, a horizontal base platform, four cylindrical rod members supported on said platform in vertical spaced relationship to define the four corners of a tetragon, a cylinder positioned centrally upright between said rod members, a piston movably mounted within said cylinder and having a piston rod portion extending through the upper end of said cylinder, hydraulic pump means for pressurizing fluid, pipe means for transmitting fluid pressures developed by said pump means to said piston for raising the same, gauge means for indicating pressures applied to said piston, vent valve means for relieving pressures on said piston to permit the lowering of the same, a tetragonal mobile platform member connected rigidly to the upper end of said piston rod, plural collar members one slidably interconnecting each of the four corners of the said mobile platform with one of said upright rod members, an immobile tetragonal platform disposed at the upper end of said rod members in spaced parallelism to said mobile platform, single rod like means carried by said mobile platform adjacent one edge thereof and extending vertically upward toward immobile platform, means for adjusting the vertical position of said rod like means, and a micrometer gauge means supported on said immobile platform and having a movable quill in coaxial alignment with said rod like means for engaging the upper end of the latter; the extent of compressing rubber like materials placed between said mobile and immobile platforms as the same are moved toward one another being measured linearly by said micrometer gauge means as the quill thereof engages the upper end of said rod like member.

References Cited in the file of this patent

UNITED STATES PATENTS

| | | |
|---|---|---|
| 1,985,598 | Carver | Dec. 25, 1934 |
| 2,078,296 | Vadner | Apr. 27, 1937 |
| 2,448,314 | Kavanagh | Aug. 31, 1948 |
| 2,501,527 | Levinsohn et al. | Mar. 21, 1950 |

FOREIGN PATENTS

| | | |
|---|---|---|
| 491,740 | France | Feb. 14, 1919 |